Sept. 30, 1930.  L. S. LEMERE ET AL  1,777,004
FISH LURE
Filed Oct. 12, 1927
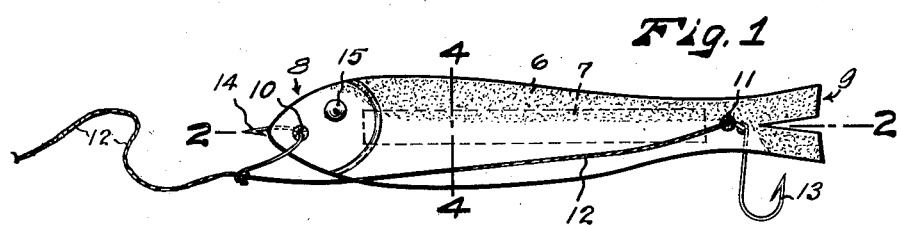
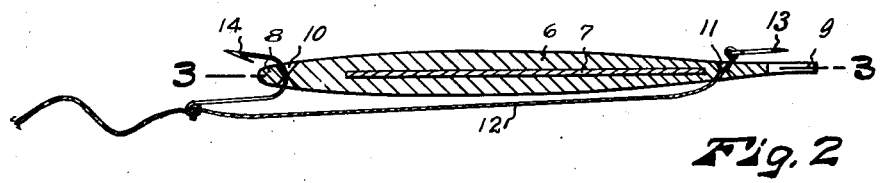
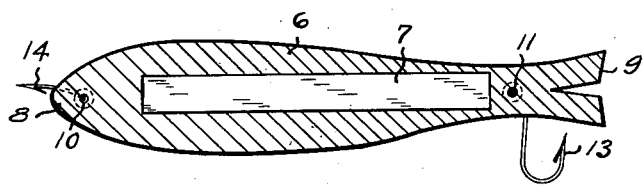
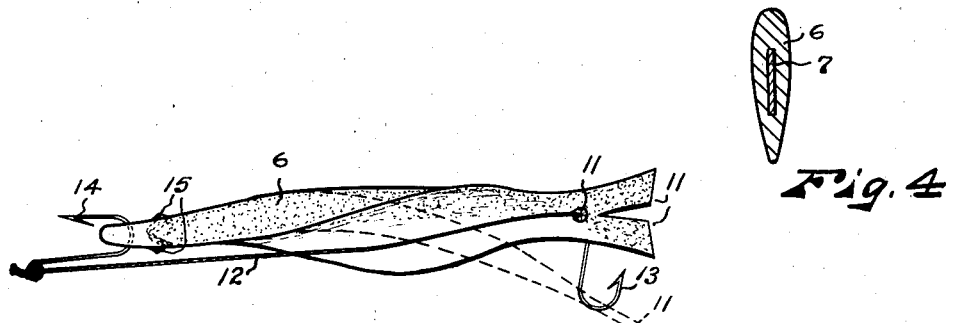
INVENTORS
Lou S. Lemere
Walter M. Long
BY
Frank Warren
ATTORNEY Patented Sept. 30, 1930

1,777,004

UNITED STATES PATENT OFFICE

LOU S. LEMERE AND WALTER M. LONG, OF SEATTLE, WASHINGTON

FISH LURE

Application filed October 12, 1927. Serial No. 225,639.

Our invention relates to improvements in fishing or trolling baits or lures and the object of our invention is to provide a fishing bait or lure of flexible construction, made to simulate a living organism and capable of being bent into different positions and of retaining the positions to which it is bent to thereby secure different movements in the water.

A more specific object is to provide a fish lure embodying a flexible rubber body shaped to simulate a fish and having a flexible, non-resilient metal plate embedded therein to render said body capable of retaining any shape to which it is bent.

A further object is to provide novel and efficient means for securing a fishing line and hooks to a lure of this nature.

Further objects are to provide a lure of this nature that is simple and cheap to manufacture and efficient in operation.

Other and more specific objects will be apparent from the following description taken in connection with the accompanying drawings.

In the drawings, Figure 1 is a view in side elevation of a fish lure constructed in accordance with our invention.

Fig. 2 is a sectional view of the same on broken line 2—2 of Fig. 1.

Fig. 3 is a sectional view on broken line 3—3 of Fig. 2 showing the embedded metal strip in elevation.

Fig. 4 is a cross section on broken line 4—4 of Fig. 1, and

Fig. 5 is a top view showing in full lines, the fish twisted and in dotted lines the fish bent in the form of a curve.

Referring to the drawings, throughout which like reference numerals designate like parts, 6 is the body portion of a lure, which is preferably formed of rubber and shaped to simulate a fish, and 7 is a flat plate or strip of non-resilient flexible metal that is embedded within the body 6 in the medial plane thereof and terminates short of the head and tail ends 8 and 9 respectively of said body portion.

A hole 10 is formed in the head 8 and another hole 11 is formed in the tail 9 of the body portion. The holes 10 and 11 extend crosswise through the lure and are of double conical shape or dished or convergent from both sides toward the center to guide a line 12 or other object as a hook that is passed through the holes and to hold the same from sliding through the holes too freely.

A line 12 having a hook 13 on its rear end, extends through the rear hole 11 thence forwardly past the head 12. Another hook 14 is hooked into the front hole 10 and fixedly secured to the line 12. This provides a hook at each end of the lure. Outwardly protruding eyes 15 are preferably provided on the head 8 and the body is painted or colored with elastic paint to simulate any desired fish.

The body 6 is flexible and capable of assuming any distorted position and the metal strip is highly ductile and easily bent, but is non-resilient so that it will tend to remain in any position into which it is bent, making it possible to bend the lure into any desired shape to give it any desired movement when it is drawn through the water as in trolling. For instance, if the body of the lure is twisted then the lure may be caused to spin in the water; if it is bent into a curve it may be caused to dart and if it is both twisted and curved a combination of the darting and spinning movement may be secured. This enables the fisherman, by skillful shaping of his lure, to secure the movement in the water best adapted for catching the particular species of fish for which he is angling.

If desired the bait may be made to simulate different living organisms other than a fish.

The foregoing description and accompanying drawings clearly disclose a preferred embodiment of our invention, but it will be understood that this disclosure is merely illustrative and that such changes in shape, size, configuration, construction and arrangement, may be made as are within the scope and spirit of the following claims.

What we claim is:—

1. A fish lure comprising a relatively flat body member of flexible material, a flexible non-resilient metal strip embedded in, and extending lengthwise of said body member, a line extending through the rear end of said body member and thence forwardly past the front end of said body member, a hook secured to said line at the rear end of said body member and another hook secured to said line and hooked through the front end of said body member.

2. A fish lure, comprising a rubber body member shaped to simulate a fish and having a hole extending crosswise through its nose portion and another hole extending crosswise through its tail portion, said holes both being convergent from both sides toward the center, a line extending through the hole in the tail of said body member and thence forwardly past the head thereof, a hook secured to the rear end of said line at the location of said tail, another hook secured to said line and hooked through the hole in said nose portion, and a flexible non-resilient metal strip embedded in said body member and extending lengthwise thereof and terminating short of said holes in said nose and tail portions.

In witness whereof, we hereunto subscribe our names this 26th day of September A. D. 1927.

LOU S. LEMERE.
WALTER M. LONG.